US009863775B2

(12) United States Patent
Kojo

(10) Patent No.: US 9,863,775 B2
(45) Date of Patent: Jan. 9, 2018

(54) VEHICLE LOCALIZATION SYSTEM

(71) Applicant: NISSAN NORTH AMERICA, INC., Franklin, TN (US)

(72) Inventor: Naoki Kojo, Sunnyvale, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 15/302,857

(22) PCT Filed: Apr. 11, 2014

(86) PCT No.: PCT/US2014/033844
§ 371 (c)(1),
(2) Date: Oct. 7, 2016

(87) PCT Pub. No.: WO2015/156821
PCT Pub. Date: Oct. 15, 2015

(65) Prior Publication Data
US 2017/0030722 A1     Feb. 2, 2017

(51) Int. Cl.
| G01C 21/32 | (2006.01) |
| F16H 59/44 | (2006.01) |
| G01C 21/26 | (2006.01) |
| G05D 1/02 | (2006.01) |
| G06K 9/00 | (2006.01) |
| G01C 21/16 | (2006.01) |
| G01S 19/47 | (2010.01) |
| G05D 1/00 | (2006.01) |

(52) U.S. Cl.
CPC .............. *G01C 21/32* (2013.01); *F16H 59/44* (2013.01); *G01C 21/165* (2013.01); *G01C 21/26* (2013.01); *G01S 19/47* (2013.01); *G05D 1/0088* (2013.01); *G05D 1/0246* (2013.01); *G05D 1/0268* (2013.01); *G05D 1/0274* (2013.01); *G05D 1/0278* (2013.01); *G06K 9/00791* (2013.01); *G05D 2201/0213* (2013.01)

(58) Field of Classification Search
None
See application file for complete search history.

(56) References Cited

U.S. PATENT DOCUMENTS

| 8,195,342 B2 | 6/2012 | Anderson |
| 2011/0184644 A1 | 7/2011 | McBurney et al. |
| 2011/0299730 A1 | 12/2011 | Elinas et al. |
| 2012/0299702 A1 | 11/2012 | Edara et al. |

OTHER PUBLICATIONS

International Search Report in PCT/US2014/033844 dated Sep. 15, 2014.

*Primary Examiner* — Shelley Chen
(74) *Attorney, Agent, or Firm* — Global IP Counselors, LLP

(57) ABSTRACT

A vehicle localization system includes a first localization system, a second localization system, and a controller. The first localization system is configured to determine a location of the vehicle using a first set of data. The second localization system is configured to determine a location of the vehicle using a second set of data. The controller is configured to switch from the first localization system to the second localization system when the first set of data is less than a predetermined amount.

13 Claims, 4 Drawing Sheets

VEHICLE LOCALIZATION SYSTEM

BACKGROUND

Field of the Invention

The present invention generally relates to a vehicle localization system for an autonomous vehicle. More specifically, the present invention relates to a vehicle localization system for an autonomous vehicle that selectively switches between two localization systems based on predetermined conditions.

Background Information

As understood in the art, autonomous vehicles generally include a vehicle control system that is capable of performing driving operations to guide the vehicle to a predetermined destination without input from the driver or with only minimal input from the driver. The vehicle control system typically uses a plurality of high speed cameras to monitor areas surrounding the vehicle. The cameras detect, for example, traffic lights, signs, intersection markers, other vehicles and obstacles, and provide visual data to the vehicle control system.

Conventional vehicle localization systems compute the position of a vehicle by comparing an image of a stored three dimensional map and a camera image. In particular, an edge image is extracted from an actual image acquired by a vehicle camera with which the vehicle is equipped. The position and attitude angle of the vehicle camera is adjusted so that a virtual image from a three dimensional map which recorded the position and type of edge of the environment by three dimensions is projected on the positional attitude of the vehicle camera. Accordingly, the position and attitude angle in three dimensional space of the vehicle camera can be estimated.

Moreover, successive images from cameras can be compared to determine the movement of the vehicle. Specifically, by comparing the location of a plurality of matching pixels from successive images, distance information can be obtained. The distance information can be compiled to determine movement of the vehicle in various directions and angles.

SUMMARY

It has been discovered that in vehicle localization systems that compute the position of a vehicle by comparing an image of a stored three dimensional map and a camera image, some drivable areas lack sufficient features stored in map data to accurately determine the vehicle position.

It has been discovered that to increase the accuracy of positional determination two localization system can be employed. Thus, in one disclosed embodiment, a vehicle localization system comprises a first localization system, a second localization system, and a controller. The first localization system is configured to determine a location of the vehicle using a first set of data. The second localization system is configured to determine a location of the vehicle using a second set of data. The controller is configured to switch from the first localization system to the second localization system when the first set of data is less than a predetermined amount.

In one embodiment, a method of operating a vehicle localization system comprises switching from a first localization system to a second localization system when a set of data is less than a predetermined amount.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The disclosed embodiments are for a vehicle localization system 12 on a host autonomous vehicle 10 that selectively switches between two localization systems based on predetermined conditions. It is noted that the vehicle localization system 12 may be used in a non-autonomous vehicle, if desired. Thus, the vehicle localization system 12 has improved vehicle control characteristics and is capable of provided autonomous control in a variety of areas. As is understood, the autonomous vehicle 10 has any additional systems and devices necessary for vehicle operation (both autonomous and not autonomous), which are not described herein.

Figure 1:
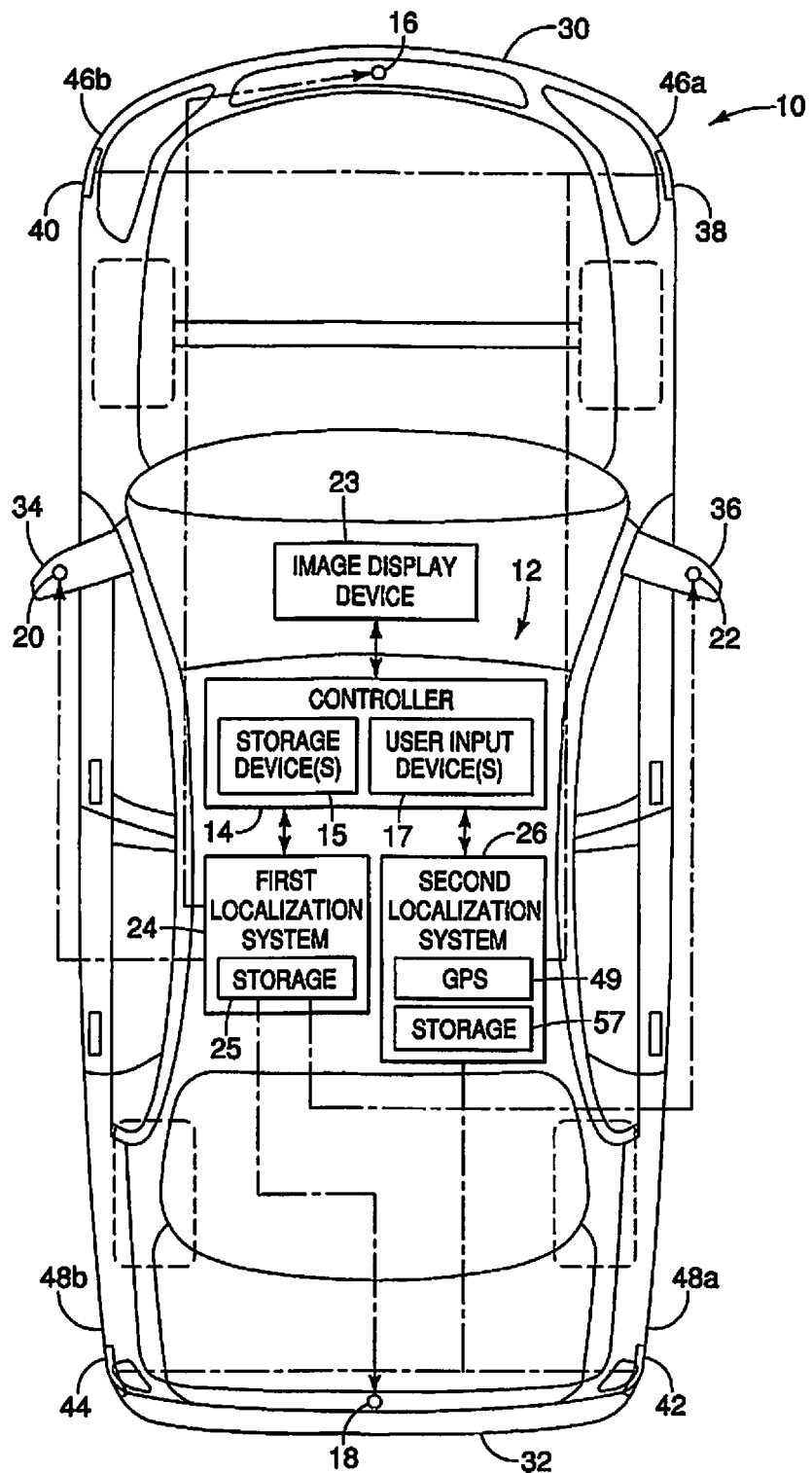
FIG. 1 is a schematic top view of an autonomous vehicle having a vehicle localization system according to one embodiment.

Referring initially to FIG. 1, an autonomous vehicle 10 having a vehicle localization system 12 is illustrated in accordance with a first embodiment. The vehicle localization system 12 includes a controller 14, an image display device 23, a first localization system 24 and a second localization system 26. The vehicle localization system 12 determines whether to operate using the first localization system 24 or the second localization system 26 based on a determined set of criterion.

The controller 14 preferably includes a microcomputer with a control program that controls the vehicle localization system 12 as discussed below. The controller 14 can also include other conventional components such as an input interface circuit, an output interface circuit, and storage devices 15, such as a ROM (Read Only Memory) device and a RAM (Random Access Memory) device. The microcomputer of the controller 14 is programmed to control one or more of the image display device 23, the first localization system 24 and the second localization system 26, and to make determinations or decisions, as discussed herein. The memory circuit stores processing results and control programs, such as ones for the image display device 23, the first localization system 24 and the second localization system 26 that are run by the processor circuit. The controller 14 is operatively coupled to the image display device 23, the first localization system 24 and the second localization system 26 in a conventional manner, as well as other electrical systems in the vehicle, such the turn signals, windshield wipers, lights, any system or device necessary or desired for vehicle operation (autonomous or otherwise) and any other suitable systems. Such a connection enables the controller 14 to monitor and control any of these systems as desired. The internal RAM of the controller 14 stores statuses of operational flags and various control data. The internal ROM of the controller 14 stores the information for various operations. The controller 14 is capable of selectively controlling any of the components of the vehicle localization system 12 in accordance with the control program. It will be apparent to those skilled in the art from this disclosure that the precise structure and algorithms for the controller 14 can be any combination of hardware and software that will carry out the functions of the present invention.

As shown in FIG. 1, the controller 14 can include or be in communication with user input devices 17. The user input devices 17 can include, for example, a human-machine interface (HMI) which enables a user (e.g., the driver and/or passenger) to interact with the vehicle control system as understood in the art and discussed herein. The controller 14 can further include or be in communication with one or more storage devices 15 which can store information as discussed herein.

Figure 2:
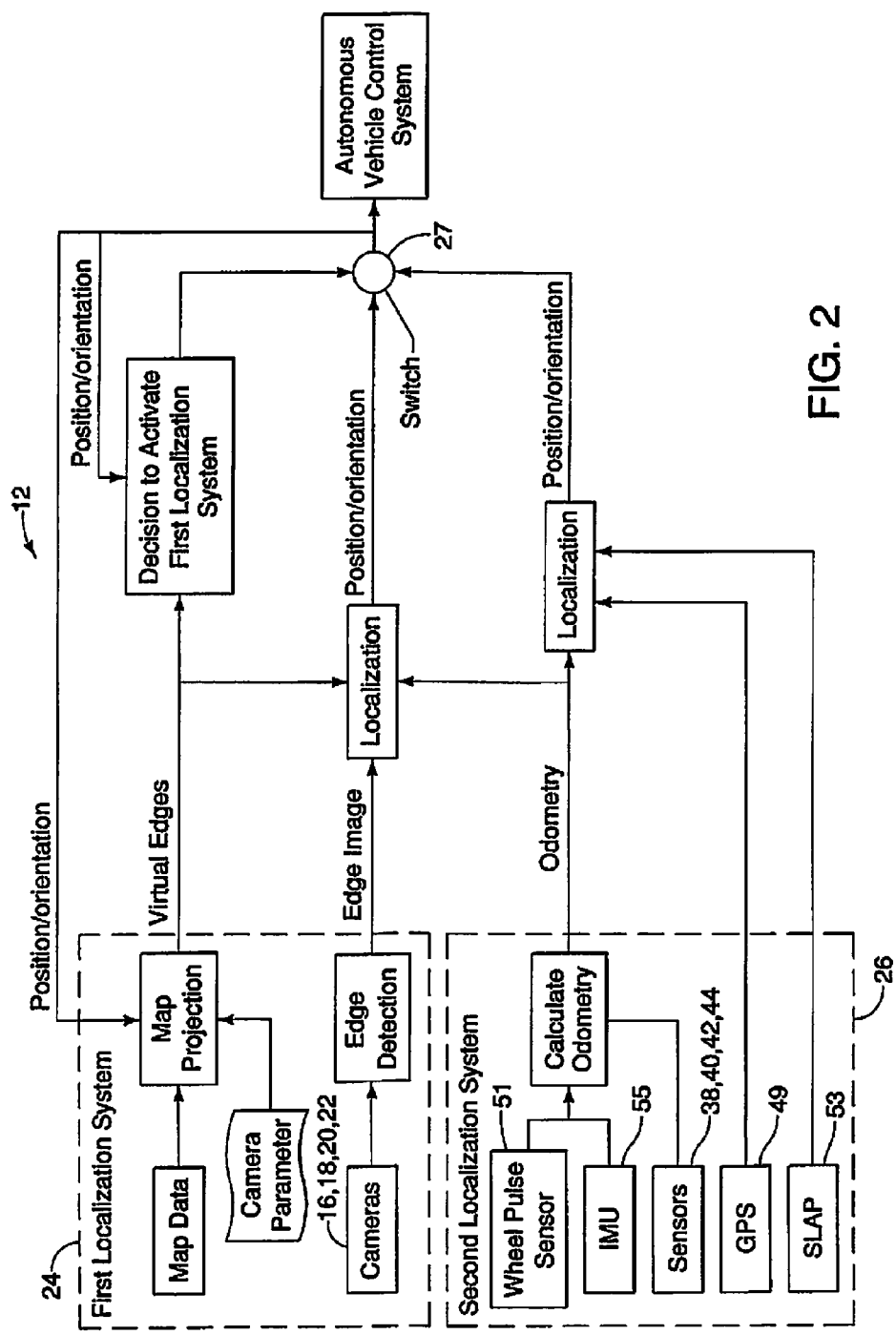
FIG. 2 is a schematic view of a vehicle localization system according to one embodiment.

As illustrated in FIGS. 1 and 2, in one embodiment, the first localization system 24 includes a plurality of cameras 16, 18, 20, 22 and map data (e.g., a 3D map) stored in a storage device 25. In one disclosed embodiment, the plurality of cameras 16, 18, 20, 22 (or optical sensors) are disposed on the external surface of the vehicle 10. It is noted that, although the optical sensors are preferably cameras 16, 18, 20, 22, the optical sensors may be any type of suitable optical sensors. In this embodiment, the cameras 16, 18, 20, 22 include four digital cameras disposed in a front 30 of the vehicle 10, a rear 32 of the vehicle 10, on the left side mirror 34 of the vehicle 10 and right side mirror 36. However, the cameras 16, 18, 20, 22 may be mounted on any suitable external portion of the host vehicle 10, including the front and rear quarter panels, or any combination of suitable areas. The cameras 16, 18, 20, 22 are preferably solid state image pickup devices, such as charge coupled device (CCD). Additionally, the cameras 16, 18, 20, 22 are arranged around the vehicle 10 and have lenses that enable imaging substantially surrounding or completely surrounding the host vehicle 10 (e.g., fish-eye cameras which have an enlarged angular field).

Moreover, as FIG. 2 illustrates the first localization system 24 includes map data (i.e., a 3D map) stored in the storage unit 25. This data can be projected into a virtual map by the controller 14. That is, the controller 14 reads stored map data (e.g., 3D map data) from the storage device 15 and projects a 3D map to a hypothetical camera. In this embodiment, the 3D map includes projected edge images or edge images projected onto the 3D map. Moreover, the controller 14 can use camera parameters from each of the cameras to determine the hypothetical image that would be generated for each camera. From this data, i.e., the virtual image (FIG. 6, discussed below), the controller 14 determines whether the second localization system 26 is to be deactivated or activated, as discussed in more detail below. The determination of whether second localization system 26 is to be deactivated or activated is sent to the switch 27.

Figure 4:
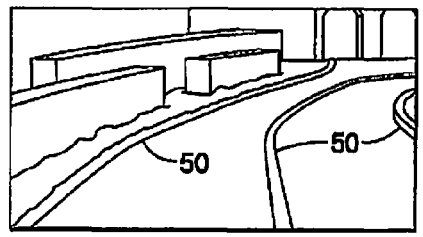
FIG. 4 shows an image captured by a camera in on embodiment of the vehicle localization system.
Figure 5:
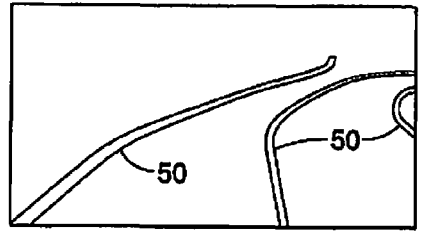
FIG. 5 shows a schematic view of the image in FIG. 4 converted to edge images.

Further, each of the cameras 16, 18, 20, 22 is configured to capture an image adjacent or at least partially surrounding the vehicle 10. The image is formed from an array of pixels and preferably includes an edge 50 or a plurality of edges 50, as shown in FIGS. 4 and 5. An edge in this image may refer to a part of the image in which the luminance of a pixel sharply changes (e.g., curbs, lane markers or edges of roads). In one embodiment, the Canny edge detecting method may be used. As shown in FIG. 5, the controller 14 generates an image based on the edge detection. This information is transmitted to the switch 27. Additionally, as shown in FIG. 2, the image based on edge detection from the cameras 16, 18, 20, 22 can be compared to the virtual image to determine the position and/or orientation of the vehicle.

In one embodiment, the second localization system 26 can include a plurality of vehicle sensors 38, 40, 42, and 44 that are configured to detect a remote object in proximity to the vehicle. For example, as illustrated in FIG. 1, the remote vehicle sensors 38, 40, 42, and 44 are preferably mounted externally on the front quarter panels 46a and 46b and rear quarter panels 48a and 48b of the vehicle 10. However, the sensors 38, 40, 42, and 44 may be mounted on any suitable external portion of the vehicle 10, including the front and rear bumpers, the external mirrors or any combination of suitable areas. The sensors 38, 40, 42, and 44 transmit data to the second localization system 26, which is then capable of using the sensor data to calculate the position of the vehicle 10 using odometry.

The vehicle sensors 38, 40, 42, and 44 can be any type of sensors desirable. For example, the front sensors can include a long-range radar device for object detection in front of the host vehicle. The front sensors may be configured to detect objects at a predetermined distance (e.g., distances up to 200 m), and thus may have a narrow field of view angle (e.g., around 15°). Due to the narrow field of view angle, the long range radar may not detect all objects in the front of the host vehicle. Thus, if desired, the front corner sensors can include short-range radar devices to assist in monitoring the region in front of the host vehicle. The rear sensors may include short-range radar devices to assist in monitoring oncoming traffic beside and behind the host vehicle. Placement of the aforementioned sensors permits monitoring of traffic flow including remote vehicles and other objects around the host vehicle, and the position of the vehicle 10 with respect to maintaining lane position or lane departure. However, the sensors 38, 40, 42, and 44 can be disposed in any position of the vehicle 10 and may include any type and/or combination of sensors to enable detection of a remote objects. In addition, the sensors may be cameras, radar sensors, photo sensors or any combination thereof. Although FIG. 1 illustrates four sensors, 38, 40, 42, and 44 there can be as few or as many sensors desirable or suitable.

Although sensors 38, 40, 42, and 44 preferably are electronic detection devices that transmit either electronic electromagnetic waves (e.g., radar), these sensors can be any suitable sensors that, for example, take computer-processed images with a digital camera and analyzes the images or emit lasers, as is known in the art. The sensors may be capable of detecting at least the speed, direction, yaw, acceleration and distance of the vehicle 10 relative to a remote object. Further, the sensors 38, 40, 42, and 44 may include object-locating sensing devices including range sensors, such as FM-CW (Frequency Modulated Continuous Wave) radars, pulse and FSK (Frequency Shift Keying) radars, sonar and Lidar (Light Detection and Ranging) devices, and ultrasonic devices which rely upon effects such as Doppler-effect measurements to locate forward objects. Object-locating devices may include charged-coupled devices (CCD) or complementary metal oxide semi-conductor (CMOS) video image sensors, and other known camera/video image processors which utilize digital photographic methods to "view" forward objects including one or more remote vehicles. The sensors are in communication with the controller 14 through second localization system 26, and are capable of transmitting information to the controller 14.

Moreover, as illustrated in FIG. 1, the second localization system 26 may include a wireless communications device, such as a GPS 49. In one embodiment the vehicle 10 receives a GPS satellite signal. As is understood, the GPS 49 processes the GPS satellite signal to determine positional information (such as location, speed, acceleration, yaw, and direction, just to name a few) of the vehicle 10. As noted herein, the second localization system 26 is in communication with the controller 14, and is capable of transmitting such positional information regarding the vehicle 10 to the controller 14.

Additionally, the second localization system 26 may include wheel pulse sensors 51, simultaneous localization and mapping (SLAM) 53 and/or an inertial measurement unit (IMU) 55. The wheel pulse sensors 51, the SLAM 53 and the IMU 55 are conventional components that are well known in the art. Since wheel pulse sensors 51 and the IMU 55 are well known in the art, these structures will not be discussed or illustrated in detail herein. Rather, it will be apparent to those skilled in the art from this disclosure that the components can be any type of structure and/or programming that can be used to carry out the present invention.

The second localization system 26 also can include a storage device 57 or have access to a storage device that stores map data. Thus, in determining the position of the vehicle 10 using any of the herein described methods, devices or systems, the positioning of the vehicle 10 may be compared to the known stored data. The storage device 57 may also store any additional information including the current or predicted vehicle position and any past vehicle position or any other suitable information.

As discussed above, and as shown in FIG. 2 the second localization system 26 can be used to determine the position and/or orientation of the vehicle 10. That is, the second localization system 26 through odometry can perform localization without the map data. Such determination can be performed by using at least one of IMU 55, wheel pulse sensors 51, and sensors 38, 40, 42, and 44. Moreover, the determination of the vehicle 10 can be determined using any suitable device or system, such as SLAM 53 and/or GPS 49, or any combination of devices and systems discussed herein. The second localization system 26 is also in communication with the switch 27. The switch 27 is in turn communications with the autonomous vehicle control system, as shown in FIG. 2.

Moreover, the vehicle localization system 12 further includes a display device 23 (i.e., an image displaying device) that is mounted in an interior of the vehicle 10 such as in an instrument panel of the vehicle 10 as illustrated in FIG. 1. The display device 23 is configured and arranged to display the display image generated by the controller 14 for a driver of the vehicle 10. Thus, the display device 23 is operatively connected to the controller 14 in a conventional manner such as using wireless communication or wires such that the controller 14 can control the operations of the display device 23. More specifically, the controller 14 is configured to generate a video image including the regions directly forward, rearward and laterally of the vehicle 10 based on the images captured by the cameras 16, 18, 20, 22, and to display the generated image on the display device 23. Thus, the display device 23 is operatively connected to the cameras 16, 18, 20, 22 via the controller 14 to display images captured by the cameras 16, 18, 20, 22. In the illustrated embodiment, the controller 14 is programmed to process the images of the cameras 16, 18, 20, 22 to display a vehicle 10 peripheral view (i.e., a composite 360 degree top view image) around the vehicle.

Figure 3:
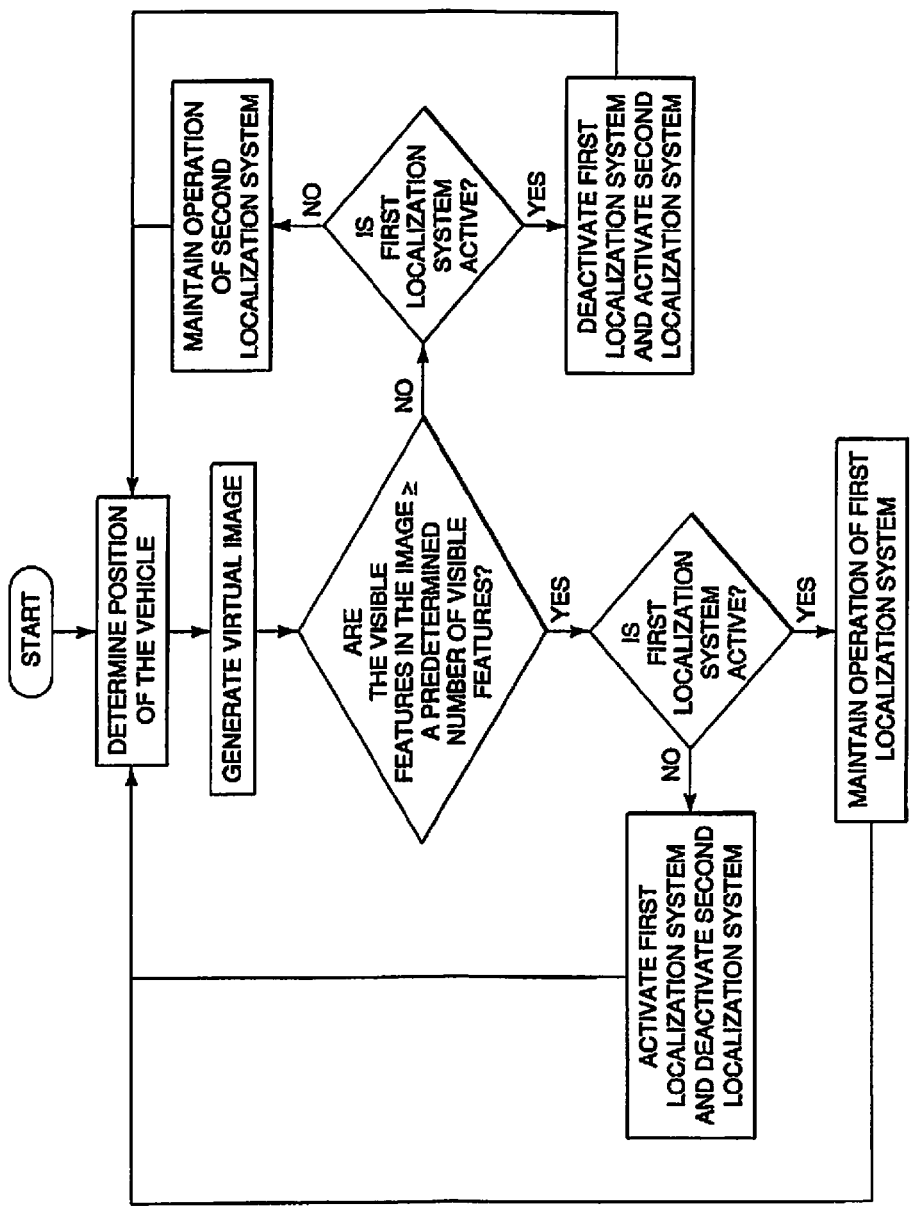
FIG. 3 is a flow chart illustrating the steps the vehicle localization system performs in one embodiment.

FIG. 3 illustrates the process for determining whether to operate using the first localization system 24 or the second localization system 26. First, the position of the vehicle is determined. The position of the vehicle can be determined in any suitable manner as described herein. That is, the position of the vehicle can be determined using the first or second localization method. Second, the controller 14 generates a virtual image for the cameras based on the position of the vehicle and the camera parameters. The controller 14 then determines whether the stored map data are less than a predetermined amount. That is, the controller 14 determines whether the features or data in the map data is greater than (or equal to) a predetermined number of features or data required to adequately use the first localization system 24.

If there are sufficient data, the controller 14 determines whether the first localization system 24 is active. If the first localization system 24 is active, the controller 14 maintains operation of the first localization system 24. If the first localization system 24 is not active, the controller 14 through the switch 27 activates the first localization system 24 and ensures that the second localization 26 system is deactive.

However, if there is not sufficient data, and the first localization system 24 is not active, the controller 14 activates or maintains operation of the second localization system 26. If the first localization system 24 is active, the controller 14 deactivates the first localization system 24 and activates the second localization system 26 using the switch 27.

Thus, the controller 14 is configured to switch from the first localization system 24 to the second localization system 26 when the first set of data is less than a predetermined amount, and configured to switch from the second localization system 26 to the first localization system 24 when the first set of data is greater than (or equal to) a predetermined amount.

Figure 6:
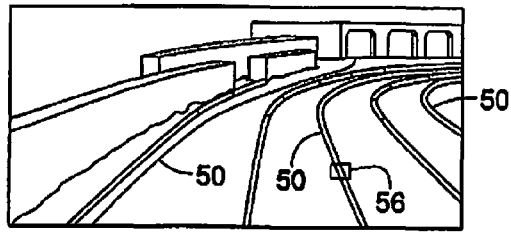
FIG. 6 shows a hypothetical image generated by a vehicle localization system with projected edge images.

FIGS. 4-6 illustrate the images formed by the first localization system 24. In particular, as illustrated in FIG. 4, in one embodiment, at least one of the cameras 16, 18, 20, 22 captures an image of an area adjacent the vehicle. This image, as discussed above, includes an edge 50 or a plurality of edges. In one embodiment, the Canny edge detecting method may be used. As shown in FIG. 5, the controller 14 generates an image based on the edge detection.

Moreover, as shown in FIG. 6, the determination of the vehicle location includes the controller 14 reading stored map data (e.g., 3D map data) from the storage device and projecting a 3D map to a hypothetical camera. In this embodiment, the 3D map includes projected edge images 50. The controller 14 then compares the edge image generated by the image captured by the camera to the 3D map from the stored map data. Thus, in this embodiment, each pixel (e.g., pixel 54; see FIG. 6) in the pixel array is compared to the 3D map. A value is given to each pixel in the camera image that matches a hypothetical pixel in the 3D map. Accordingly, the vehicle localization system 12 is generally capable of determining the position and orientation of the vehicle using the first localization system 24.

Figure 7:
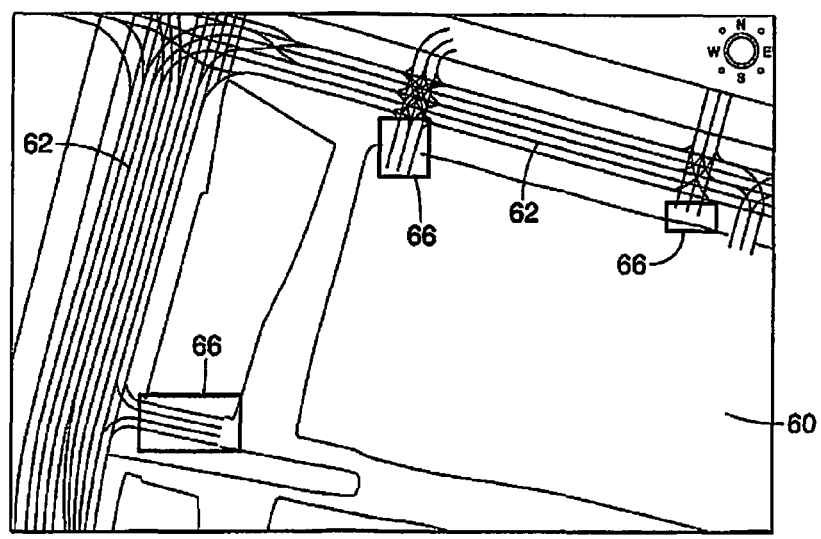
FIG. 7 is a schematic view of possible switching points for one embodiment of the vehicle localization system.

However, is some areas in which the vehicle may operate, sufficient data or features may not be available in the stored map data to sufficiently determine the vehicle position using the first localization system 24. Such an area 60 may be a parking lot or other area, as illustrated in FIG. 7. In such an area it is necessary to operate the vehicle using the second localization system 26. That is, for example, when there are not sufficient features or data stored in the stored map data the vehicle localization system 12 may determine that use of the sensors, SLAM, wheel sensors, IMU or GPS or any other system is preferable. Thus, when the vehicle is in operation in an area with sufficient data or features in the stored map data, such as area 62, the vehicle localization system 12 activates first localization system 24 and ensures that the second localization system 26 is deactivated. Further, when the vehicle is in operation in an area with insufficient data or features in the stored map data, such as area 60, the vehicle localization system 12 deactivates the first localization system 24 and ensures that the second localization system 26 is deactivated. As illustrated in FIG. 7, the decision can be made at the transition area 66 from area 62 to area 60.

Accordingly, when the vehicle enters an area with insufficient stored map data, the vehicle localization system 12 performs the analysis discussed herein to determine which localization system is preferable. Thus, the vehicle localization system 12 improves autonomous vehicle 10 operation enabling an improved autonomous vehicle 10 capable of operating in a variety of areas.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," or "element" when used in the singular can have the dual meaning of a single part or a plurality of parts. Also as used herein to describe the above embodiment(s), the following directional terms "forward", "front", "rear", and "above", as well as any other similar directional terms refer to those directions of a vehicle equipped with the vehicle localization system 12. Accordingly, these terms, as utilized to describe the present invention should be interpreted relative to a vehicle equipped with the vehicle localization system 12.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An autonomous vehicle localization system, comprising:
   a camera configured to capture visible road features in an image of an area at least partially surrounding the vehicle;
   a first localization system configured to determine a location of the vehicle using a first set of data, including stored map data by comparing the visible road features with the stored map data to determine the location of the vehicle;
   a second localization system configured to determine a location of the vehicle using a second set of data; and
   a controller configured to enable autonomous operation of the vehicle based on the location determined by the first localization system and switch from the first localization system to the second localization system when a numerical amount of the stored map data is less than a predetermined amount, such that first localization system is inadequate.

2. The vehicle localization system according to claim 1, further comprising
   a storage device configured to store the map data.

3. A vehicle localization system, comprising:
   a camera configured to capture visible features in an image of an area at least partially surrounding the vehicle;
   a first localization system configured to determine a position of the vehicle by comparing edge images extracted from the image from the camera and compare each edge image from the camera to a corresponding virtual edge image in the map data stored in the storage device;
   a second localization system configured to determine a location of the vehicle using a second set of data;
   a controller configured to switch from the first localization system to the second localization system when a numerical amount of the first set of data is less than a predetermined amount; and
   a storage device configured to store the map data.

4. The vehicle localization system according to claim 1, wherein
   the second localization system includes at least one of a global positioning system, odometery and simultaneous localization and mapping.

5. The vehicle localization system according to claim 4, wherein
   the second localization system includes the global positioning system.

6. The vehicle localization system according to claim 5, further comprising
   a storage device configured to store the map data.

7. The vehicle localization system according to claim 1, wherein
   the second localization system includes at least one of wheel sensors and inertial measurement unit sensors.

8. The vehicle localization system according to claim 1, wherein
the controller is configured to switch from the second localization system to the first localization system when the numerical amount of the stored map data is greater than the predetermined amount.

9. A method of operating an autonomous vehicle localization system, the method comprising:
capturing, with a camera, visible road features in an image of an area at least partially surrounding the vehicle;
determining a location of the vehicle with a first localization system by using a first set of data, including stored map data and comparing the visible road features with the stored map data; and
switching from the first localization system to a second localization system when a numerical amount of a set of stored map data is less than a predetermined amount, such that the first localization system is ineffective, to enable autonomous operation of the vehicle.

10. The method according to claim 9, further including
switching from the second localization system to the first localization system when the numerical amount of the set of stored map data is greater than the predetermined amount.

11. The vehicle localization system according to claim 3, wherein
the edge images extracted from the image from the camera are areas of the image in which luminance of a pixel changes.

12. The vehicle localization system according to claim 1, wherein
the first localization system is configured to determine the location of the vehicle by comparing areas of the image in which luminance of a pixel changes with the stored map data.

13. The method according to claim 9, wherein
the determining the location of the vehicle with the first localization system includes comparing areas of the image in which luminance of a pixel changes with the stored map data.

* * * * *